UNITED STATES PATENT OFFICE.

BRIAN CHARLES BESLEY, OF HOWELL, NEW SOUTH WALES, AUSTRALIA.

PROCESS OF EXTRACTING TIN FROM BASE BULLION.

1,060,527. Specification of Letters Patent. Patented Apr. 29, 1913.

No Drawing. Application filed June 21, 1912. Serial No. 705,112.

*To all whom it may concern:*

Be it known that I, BRIAN CHARLES BESLEY, a subject of the King of Great Britain and Ireland, residing at Howell, in the State of New South Wales, Australia, have invented certain new and useful Improvements in Processes of Extracting Tin from Base Bullion, of which the following is a specification.

My invention relates to the extraction of tin from lead or base bullion and it consists in a process in which the tin is extracted therefrom as an oxid by means of an oxid of lead.

The process may be conducted in a pot or crucible but in practice it is conducted on a large scale in a furnace of the reverberatory type. Rock salt or common salt is introduced into the furnace and brought to a liquid condition therein by raising and maintaining the temperature above its fusion point. For salt, borax may be substituted, but borax is objectionable on account of its relatively high cost and because it forms a slag with the bullion, from which slag the borax cannot be recovered economically. In practice rock salt is preferred because of its relatively low cost.

The base bullion is introduced into the bath of molten salt in the furnace by dropping it into the same in a solid condition, or it may be poured in a molten condition into the bath. The bullion sinks in the bath, the molten salt forming a cover, which should be of substantial depth, preferably about four inches. This cover prevents volatilization and oxidation of the bullion by atmospheric contact and consequent loss of lead and silver. The salt bath and the bullion contained in it being maintained in a fused condition, the oxid of lead, litharge or red lead (litharge preferably) is thrown into the furnace. About two weights of litharge or red lead are used to each weight of tin in the bullion, but a greater or less proportion within a reasonable range will be effective. After a period of about half an hour during which time the tin becomes associated with the lead oxid and leaves the molten lead, the furnace is tapped and the molten lead carrying the silver contents of the bullion is run off into molds, the salt is run off and saved, and the tin lead oxid is drawn out in lumps. Then another charge may be treated in the furnace, the salt saved from the previous run being reused. The lead-silver product contains only a trace of tin. The tin-lead oxid is reduced by smelting in a reducing atmosphere in a blast furnace with coke and slag obtained from the lead smelting furnace in which the bullion was produced. A marketable product in the shape of a tin-lead solder is thus obtained. When the process is conducted on a small scale in a pot or crucible, the products are found in separate strata after cooling and may be readily separated by breaking the layers apart.

What I claim as my invention and desire to secure by Letters Patent is:

1. The process of treating base bullion which consists essentially in separating tin therefrom by fusing the bullion with an oxid of lead in a fused bath of neutral material which excludes atmospheric contact, and separating mechanically the metallic lead and the tin-lead oxid.

2. The herein described process of extracting tin from base bullion, which consists in fusing the bullion with an oxid of lead under a cover of molten salt, tapping off the lead, withdrawing the tin-lead oxid, and smelting or reducing said oxid to metal for the production of a tin-lead alloy.

In testimony whereof I have affixed my signature in presence of two witnesses.

BRIAN CHARLES BESLEY.

Witnesses:
S. BECK,
W. J. DAVIS.

Copies of this patent may be obtained for five cents each, by addressing the "Commissioner of Patents, Washington, D. C."